(12) United States Patent
Hosoda

(10) Patent No.: US 10,505,417 B2
(45) Date of Patent: Dec. 10, 2019

(54) ROTOR AND ROTARY ELECTRIC MACHINE

(71) Applicant: FANUC CORPORATION, Yamanashi (JP)

(72) Inventor: Akihiro Hosoda, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 3 days.

(21) Appl. No.: 16/010,915

(22) Filed: Jun. 18, 2018

(65) Prior Publication Data

US 2018/0375394 A1 Dec. 27, 2018

(30) Foreign Application Priority Data

Jun. 21, 2017 (JP) ................................. 2017-121378

(51) Int. Cl.
*H02K 1/27* (2006.01)
*H02K 1/28* (2006.01)
*H02K 29/03* (2006.01)

(52) U.S. Cl.
CPC ............. *H02K 1/2766* (2013.01); *H02K 1/28* (2013.01); *H02K 29/03* (2013.01); *H02K 2213/03* (2013.01)

(58) Field of Classification Search
CPC .......... H02K 1/27; H02K 1/2766; H02K 1/28; H02K 2213/03; H02K 29/03
See application file for complete search history.

(56) References Cited

U.S. PATENT DOCUMENTS

| 2007/0063607 A1* | 3/2007 | Hattori | ................. | H02K 1/2766 |
| | | | | 310/156.53 |
| 2008/0136281 A1* | 6/2008 | Fujii | .................... | H02K 1/2766 |
| | | | | 310/156.08 |
| 2008/0231135 A1* | 9/2008 | Suzuki | ................. | H02K 1/2766 |
| | | | | 310/156.53 |
| 2010/0148612 A1* | 6/2010 | Takemoto | .............. | H02K 1/276 |
| | | | | 310/156.53 |
| 2013/0119807 A1 | 5/2013 | Nakada | | |

(Continued)

FOREIGN PATENT DOCUMENTS

| JP | 2007306735 A | 11/2007 |
| JP | 2008148391 A | 6/2008 |
| JP | 2008148482 A | 6/2008 |

(Continued)

OTHER PUBLICATIONS

English Abstract and Machine Translation for Japanese Publication No. 2007-306735 A, published Nov. 22, 2007, 9 pgs.

(Continued)

*Primary Examiner* — Naishadh N Desai
(74) *Attorney, Agent, or Firm* — Fredrikson & Byron, P.A.

(57) ABSTRACT

A rotor has a first slot and a second slot each being substantially rectangular and together forming a V-shape when viewed from the direction of a rotary axis. The rotor also has flux barriers each provided between a first abutting portion and a second abutting portion on an outer peripheral side of each of the first slot and the second slot and formed to bulge toward the outer peripheral side relative to short edges on the outer peripheral side of the first slot and the second slot when viewed from the direction of the rotary axis of the rotor core.

6 Claims, 5 Drawing Sheets

(56) References Cited

U.S. PATENT DOCUMENTS

2013/0307363 A1\* 11/2013 Sano .................... H02K 1/2766
310/156.01

FOREIGN PATENT DOCUMENTS

| JP | 201229524 A | 2/2012 |
| JP | 201553757 A | 3/2015 |
| JP | 2015192575 A | 11/2015 |
| JP | 2015208184 A | 11/2015 |
| WO | 2012014834 A1 | 2/2012 |

OTHER PUBLICATIONS

English Abstract for Japanese Publication No. 2008-148482 A, published Jun. 26, 2008, 2 pgs.

English Abstract and Machine Translation for Japanese Publication No. 2015-192575 A, published Nov. 2, 2015, 11 pgs.

Untranslated Decision to Grant a Patent mailed by Japan Patent Office (JPO) for Application No. JP 2017-121378, dated Feb. 26, 2019, 3 pgs.

English Machine Translation of Decision to Grant a Patent mailed by Japan Patent Office (JPO) for Application No. JP 2017-121378, dated Feb. 26, 2019, 3 pgs.

Untranslated Notification of Reasons for Refusal mailed by Japan Patent Office (JPO) for Application No. JP 2017-121378, dated Oct. 30, 2018, 3 pgs.

English Machine Translation of Notification of Reasons for Refusal mailed by Japan Patent Office (JPO) for Application No. JP 2017-121378, dated Oct. 30, 2018, 3 pgs.

English Abstract and Machine Translation for Japanese Publication No. 2015-208184 A, published Nov. 19, 2015, 6 pgs.

English Abstract and Machine Translation for Japanese Publication No. 2015-053757 A, published Mar. 19, 2015, 15 pgs.

English Abstract and Machine Translation for Japanese Publication No. 2012-029524 A, published Feb. 9, 2012, 10 pgs.

English Abstract and Machine Translation for Japanese Publication No. 2008-148391 A, published Jun. 26, 2008, 7 pgs.

\* cited by examiner

FIG. 4

| Model for Analysis | Model C (Outer Side End) | Model D (Close to Outer Side End) | Model E (Center) | Model F (Inner Side End) | Model G (Two Barriers for Each) |
|---|---|---|---|---|---|
| Cogging Torque | 10 | 1 | 7 | 15 | 13 |
| Amount of Decreased Torque | 1.1 | 1.6 | 1.8 | 2.4 | 1 |
| Stress Concentration Value | 4 | 1.2 | 1.4 | 2 | 1.5 |

ROTOR AND ROTARY ELECTRIC MACHINE

CROSS-REFERENCE TO RELATED APPLICATION

This application is based upon and claims the benefit of priority from Japanese Patent Application No. 2017-121378 filed on Jun. 21, 2017, the contents of which are incorporated herein by reference.

BACKGROUND OF THE INVENTION

Field of the Invention

The present invention relates to an embedded magnet type rotor and further to a rotary electric machine having the embedded magnet type rotor.

Description of the Related Art

International Publication No. WO 2012/014834 (hereafter referred to as Patent Literature 1) discloses a rotor of a rotary electric machine wherein a pair (i.e., two) of slots arranged in a V-shape are connected to an empty space at their root portions and an empty space is also provided at a distal end side of each slot.

SUMMARY OF THE INVENTION

In the technology disclosed in Patent Literature 1, the force urging permanent magnet to move radially outward due to a centrifugal force during the rotation of a rotor core is supported by a portion that is on the distal end side of each slot and contacts with the permanent magnet. In Patent Literature 1, the root portion of each slot is connected to the empty space, and thus, the strength at the distal end side of each slot is weaker than the strength of one in which the root portion of each slot is closed. In order to secure a sufficient strength, it is necessary to secure the thickness between the distal end of each slot and an outer periphery of the rotor core. This gives rise to a problem that the outer diameter of the rotor core increases and another problem that magnetic flux leakage occurs at the thickened portion, resulting in a decrease in torque.

The present invention has been made in order to solve the aforementioned problems, and it is an object of the present invention to provide a rotor and a rotary electric machine capable of decreasing a stress concentration value on an outer peripheral side of each slot.

In one aspect of the present invention, a rotor comprises a rotor core rotatable together with a rotor shaft, a first slot and a second slot piercing the rotor core a direction of a rotary axis, each being substantially rectangular and together forming a V-shape with outer peripheral sides placed farther from each other and with inner peripheral sides placed closer to each other when viewed from the direction of the rotary axis of the rotor core, a communication portion piercing the rotor core in the direction of the rotary axis and connecting the inner peripheral sides of the first slot and the second slot, a first permanent magnet and a second permanent magnet each being substantially rectangular when viewed from the direction of the rotary axis of the rotor core, and inserted into the first slot and the second slot, respectively, first abutting portions being at short edges on the outer peripheral side of the first slot and the second slot and formed on inner sides of the first slot and the second slot when viewed from the direction of the rotary axis of the rotor core, the first abutting portions abutting against the first permanent magnet and the second permanent magnet, second abutting portions being at the short edges on the outer peripheral side of the first slot and the second slot and formed on outer sides of the first slot and the second slot when viewed from the direction of the rotary axis of the rotor core, the second abutting portions abutting against the first permanent magnet and the second permanent magnet, and flux barriers provided between the first abutting portion and the second abutting portion and formed to bulge toward the outer peripheral side relative to the short edges on the outer peripheral side of the first slot and the second slot when viewed from the direction of the rotary axis of the rotor core.

According to the present invention, it is possible to decrease a stress concentration value on the outer peripheral side of the slots.

The above and other objects, features and advantages of the present invention will become more apparent from the following description when taken in conjunction with the accompanying drawings, in which a preferred embodiment of the present invention is shown by way of an illustrative example.

BRIEF DESCRIPTION OF THE DRAWINGS

FIG. 4 is a table showing simulation results in the case where the arrangement and the number of flux barriers are changed.

DESCRIPTION OF THE PREFERRED EMBODIMENTS

First Embodiment

[Configuration of Rotary Electric Machine]

Figure 1:
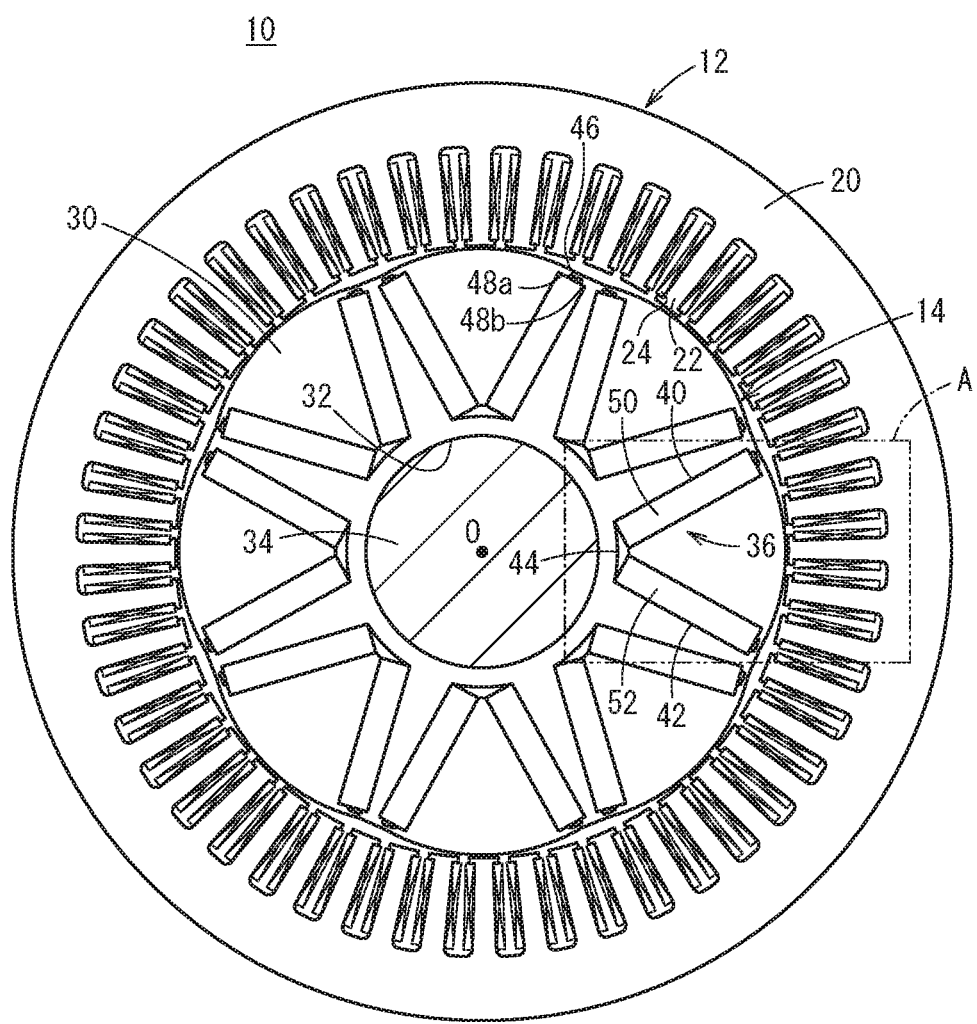
FIG. 1 is a schematic diagram showing the configuration of a rotary electric machine.
Figure 2:
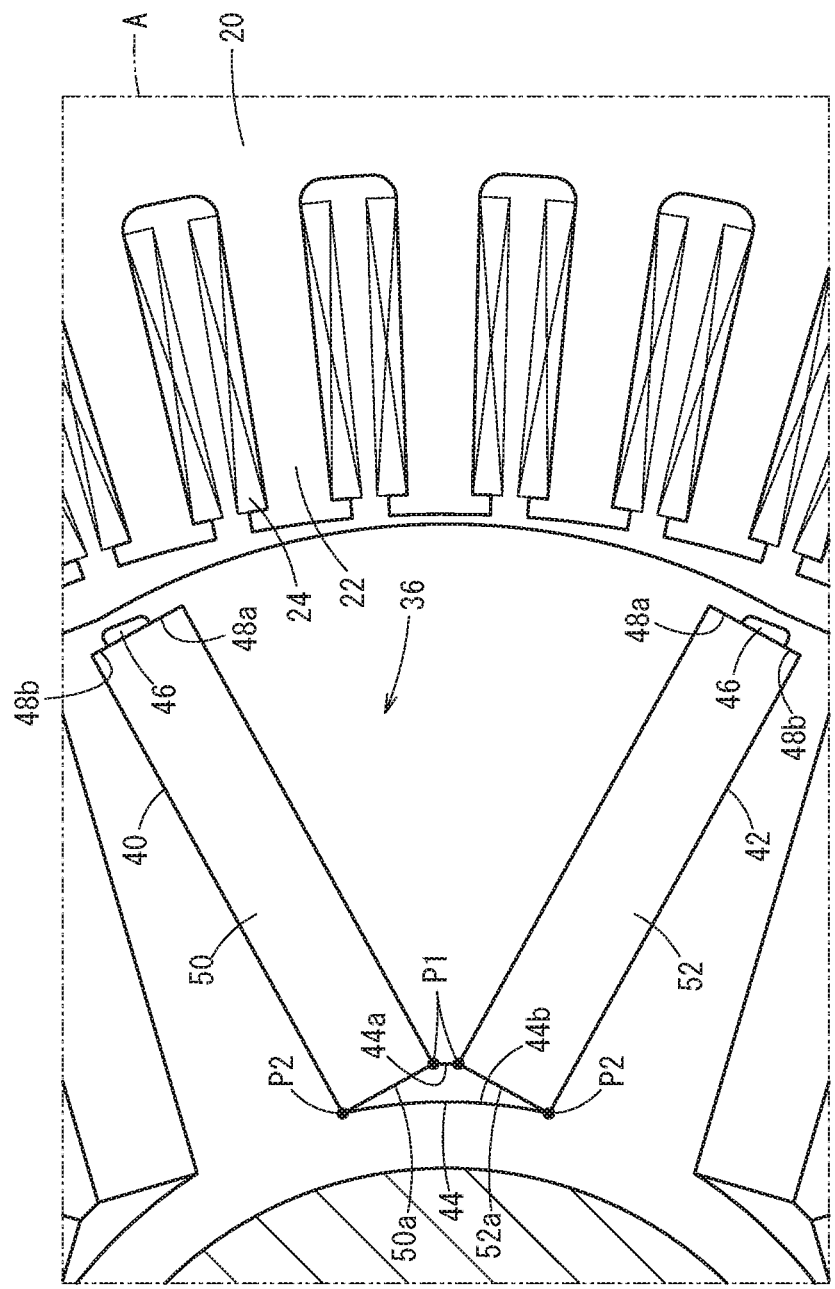
FIG. 2 is an enlarged illustration of a square frame portion A in FIG. 1.

FIG. 1 is a schematic diagram showing the configuration of a rotary electric machine 10. FIG. 2 is an enlarged illustration of a square frame portion A in FIG. 1. The rotary electric machine 10 has a stator 12 and a rotor 14. The stator 12 has a stator core 20 that has a substantially cylindrical shape and is made of an iron-based metal. The stator core 20 has a plurality of teeth 22 arranged in a circumferential direction and protruding radially inward. A coil 24 is wound around each of the teeth 22.

The rotor 14 has a rotor core 30 that takes a substantially cylindrical shape. The rotor core 30 is formed with laminated steel plates where thin steel plates are laminated in the direction of the rotary axis O. The rotor core 30 has a shaft insertion hole 32 piercing along the rotary axis O. A rotor shaft 34 is inserted into the shaft insertion hole 32 by shrink fitting. Thus, the rotor core 30 rotates together with the rotor shaft 34. The rotor core 30 has a plurality of slots 36 piercing in the direction of the rotary axis O and arranged in a circumferential direction.

Each slot 36 has a first slot 40, a second slot 42, a communication portion 44, and flux barriers 46. The first and second slots 40, 42 are each formed in a substantially rectangular shape when the rotor core 30 is viewed from the direction of the rotary axis O. The first and second slots 40, 42, when the rotor core 30 is viewed from the direction of the rotary axis O, are arranged in a V-shape whose radially outer peripheral sides are separated from each other and whose radially inner peripheral sides come close.

The flux barriers 46 are formed on the outer peripheral side of the first and second slots 40, 42. The flux barriers 46 are formed to bulge radially outward from short edges (short sides) on the outer peripheral side of the first and second slots 40, 42 when the rotor core 30 is viewed from the direction of the rotary axis O. The flux barriers 46 are formed at intermediate portions of the short edges on the outer peripheral side of the first and second slots 40, 42 and closer to the outer sides, rather than the inner side, of the slots 36 when the rotor core 30 is viewed from the direction of the rotary axis O. Thus, each short edge on the outer peripheral side of the first and second slots 40, 42, when the rotor core 30 is viewed from the direction of the rotary axis O, is divided into a first abutting portion 48a and a second abutting portion 48b to make the first abutting portion 48a longer in length than the second abutting portion 48b. Incidentally, the first abutting portion 48a is formed on an inner side of each slot 36 while the second abutting portion 48b is formed on the outer side of each slot 36.

The communication portion 44 is formed on the inner peripheral side of the first and second slots 40, 42. The communication portion 44, when the rotor core 30 is viewed from the direction of the rotary axis O, is formed in a substantially isosceles trapezoid having a side connecting a pair of endpoints P1 and P1, which are closer to each other, and a side connecting a pair of the corner end points P2 and P2, which are farther from each other, where P1 and P2 are end points of sides of the first slot 40 and the second slot 42 on the inner side.

A first permanent magnet 50 is inserted into the first slot 40, and a second permanent magnet 52 is inserted into the second slot 42. Thus, the first and second permanent magnets 50, 52 are arranged in a V-shape. At this time, an arrangement is made so that a pole on the inner side of the first permanent magnet 50 and a pole on the inner side of the second permanent magnet 52 have the same polarity.

The first and second permanent magnets 50, 52 are formed in a substantially rectangular shape and are formed in substantially the same shape as the first and second slots 40, 42 when the rotor core 30 is viewed from the direction of the rotary axis O.

The outer peripheral side of the first and second permanent magnets 50, 52 abuts on the first abutting portion 48a and the second abutting portion 48b of the short edge on the outer peripheral side of each of the first and second slots 40, 42. Further, the inner peripheral side of the first and second permanent magnets 50, 52 abuts on the endpoints P2, P2 of the communication portion 44. Thus, the first and second permanent magnets 50, 52 are positioned relative to the first and second slots 40, 42, respectively. In this state, the short edges on the inner peripheral side of the first and second permanent magnets 50, 52 substantially coincide with the short edges on the inner peripheral side of the first and second slots 40, 42. A resin is filled between the first permanent magnet 50 and each of the first slot 40, the communication portion 44 and the flux barrier 46 and between the second permanent magnet 52 and each of the second slot 42, the communication portion 44 and the flux barrier 46, whereby the first and second permanent magnets 50, 52 are secured in the first and second slots 40, 42, respectively.

When the rotor core 30 is viewed from the direction of the rotary axis O, the side surface 44a between the endpoints P1, P1 of the communication portion 44, the side surface 44b between the endpoints P2, P2, and the short edges 50a, 52a of the first and second permanent magnets 50, 52 on inner side form a space having a substantially isosceles trapezoidal shape. When the rotor core 30 is viewed in the rotary axis O direction, the side surface 44a and the side surface 44b may be linear-shaped or may be arc-shaped with the rotary axis O being the arc's center.

By the provision of the communication portion 44 and the flux barriers 46, a part of each short edge portion of the first and second permanent magnets 50, 52 does not directly abut against the rotor core 30. This configuration does not allow the magnetic flux to leak from the short edges of the first and second permanent magnets 50, 52 and thus can keep torque of the rotary electric machine 10 from decreasing.

[Simulation Results]

Figure 3:
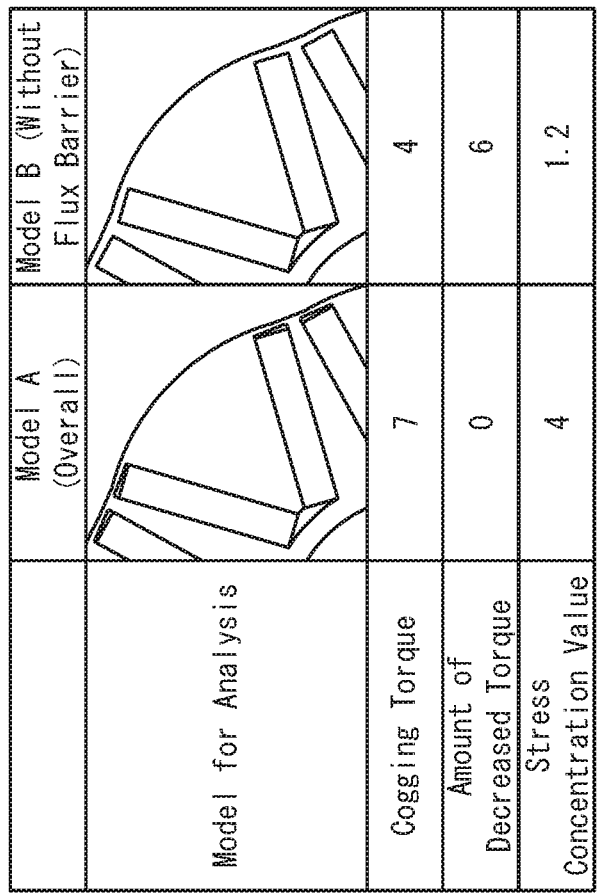
FIG. 3 is a table showing simulation results in the case of the presence or absence of flux barriers.

FIG. 3 is a table showing simulation results in the case of the presence or absence of the flux barriers 46. Through the simulations, the present inventor have calculated cogging torque produced on the rotary electric machine 10, an amount of torque decrease due to the magnetic flux leakage from the first and second permanent magnets 50, 52, and a stress concentration value exerted on the neighborhood of the outer peripheral side short edges (including the flux barriers 46) of the first and second slots 40, 42. The values in the table are evaluation values of which smaller values indicate smaller cogging torque, a smaller amount of torque decrease, and a smaller stress concentration value and thus better values.

As mentioned earlier, the provision of the flux barriers 46 does not allow the magnetic flux to leak from the short edges of the first and second permanent magnets 50, 52 and thus can keep torque of the rotary electric machine 10 from decreasing. However, it became clear through the simulations that as shown in the model A of FIG. 3, the provision of the flux barrier 46 caused the stress concentration value to become higher in the neighborhood of the outer peripheral side short edges of the first and second slots 40, 42.

In the present embodiment, the inner peripheral side of the first and second slots 40, 42 are connected to the communication portion 44. In short, the inner peripheral side short edges of the first and second slots 40, 42 are open. For this reason, in comparison with a configuration in which the first and second slots 40, 42 are closed by steel plates at the inner peripheral side short edges, the strength in the neighborhood of the outer peripheral side short edges of the first and second slots 40, 42 is smaller. Thus, it is desirable that the stress concentration value in the neighborhood of the outer peripheral side short edges of the first and second slots 40, 42 should be as small as possible.

The inventor of the present invention further performed simulation with various arrangements and various numbers of the flux barriers 46. FIG. 4 is a table showing results of the simulation when the flux barriers 46 were changed in arrangement and number.

FIG. 4 shows results of the simulation in the following five models. The five models include Model C in which each flux barrier 46 is arranged on the outer peripheral side short edge of each of the first and second slots 40, 42 and at an end on the outer side (i.e., outer side end portion) of each of the slots 40, 42; Model D in which each flux barrier 46 is arranged at an intermediate position of the outer peripheral side short edge of each of the first and second slots 40, 42 but is closer to the outer side of the slot 36; Model E in which each flux barrier 46 is arranged at a central position of the outer peripheral side short edge of each of the first and second slots 40, 42; Model F in which each flux barrier 46 is arranged on the outer peripheral side short edge of each of the first and second slots 40, 42 and at an end of the inner side of each slot 36; and Model G in which each slot 36 is provided with two flux barriers 46. Model D shows the arrangement of the flux barriers 46 according to the present embodiment.

Based on the results of the simulation shown in FIG. 4, the present embodiment has adopted Model D which is the smallest in stress concentration value in comparison with other models. By adopting Model D, it is possible to make the stress concentration value smaller than those of other models having the flux barriers 46. Furthermore, Model D is smaller in cogging torque than other models and enables the rotary electric machine 10 to rotate smoothly. Incidentally, Model E may be adopted in which the stress concentration value is the second smallest, next to Model D, and the cogging torque and the amount of decreased torque are relatively small in comparison with other models.

Advantageous Effects

By providing the flux barriers 46 at the outer peripheral side short edges of the first and second slots 40, 42, it is possible to make small the torque decrease amount of the rotary electric machine 10. However, when the flux barriers 46 are provided over the short edge as Model A in FIG. 3, the stress concentration value increases at around the outer peripheral side short edges of the first and second slots 40, 42.

To avoid this, according to the present embodiment, when the rotor core 30 is viewed from the direction of the rotary axis O, the flux barriers 46 are each formed at an intermediate portion of each outer peripheral side short edge of the first and second slots 40, 42. By providing the flux barriers 46 in this way, it is possible to suppress the amount of decreased torque of the rotary electric machine 10 and at the same time, to restrain an increase of the stress concentration value around the outer peripheral side short edges of the first and second slots 40, 42.

Further, because the stress concentration value around the outer peripheral side short edges of the first and second slots 40, 42 is prevented from increasing, it is possible to reduce the thickness between the outer peripheral side end portions of the first and second slots 40, 42 and the outer peripheral surface of the rotor core 30, whereby the diameter of the rotor core 30 is prevented from increasing.

Furthermore, in the present embodiment, the flux barriers 46 are arranged so that when viewed from the direction of the rotary axis O of the rotor core 30, the first abutting portion 48a is longer than the second abutting portion 48b. With this arrangement, it is possible to reduce further the stress concentration value around the outer peripheral side short edges of the first and second slots 40, 42. Accordingly, by providing the flux barriers 46, it is possible to suppress the decrease of torque and at the same time, to avoid the increase of the outer diameter of the rotor core 30. Further, because the cogging torque can be suppressed, the rotary electric machine 10 can rotate smoothly.

Furthermore, in the present embodiment, when viewed from the direction of the rotary axis O of the rotor core 30, the communication portion 44 is formed so that the endpoints P1, P1 which are closer to each other are connected and the endpoints P2, P2 which are farther from each other are connected among the endpoints P1, P1, P2, P2 of the short edges on the inner peripheral side of the first and second slots 40, 42 into which the first and second permanent magnets 50, 52 are respectively inserted. With this arrangement, it is possible to make a configuration that each side on the inner peripheral side of the first and second permanent magnets 50, 52 does not abut against the rotor core 30 over the entire surface, and thus, it is possible to decrease the leakage of magnetic flux.

Further, in the present embodiment, the shape of the communication portion 44 is a substantially isosceles trapezoid when viewed from the direction of the rotary axis O of the rotor core 30. When the rotor core 30 is viewed from the direction of the rotary axis O, the side surface 44a of the communication portion 44 is in the shape of a straight line or an arc about the rotary axis O, and thus, the side surface 44a becomes substantially parallel to the inner peripheral surface of the shaft insertion hole 32. Therefore, it is possible to have room for the shrink-fitting of the rotor shaft 34 in the rotor core 30.

Further, in the present embodiment, the short edges 50a, 52a on the inner peripheral side of the first and second permanent magnets 50, 52 match the short edges on the inner peripheral side of the first and second slots 40, 42. With this arrangement, the first and second permanent magnets 50, 52 abut against the endpoints P2, P2 of the first and second slots 40, 42, respectively and thus, it is possible to position the first and second permanent magnets 50, 52 relative to the first and second slots 40, 42. Further, the length of the slots 36 in the radial direction of the rotor core 30 can be reduced and thus, it is possible to make the outer diameter of the rotor core 30 shorter.

Further, in the present embodiment, resin is filled in the first slot 40, the second slot 42, the communication portion 44, and flux barriers 46. Therefore, it is possible to secure the first and second permanent magnets 50, 52 relative to the first and second slots 40, 42, respectively.

[First Modification]

Figure 5:
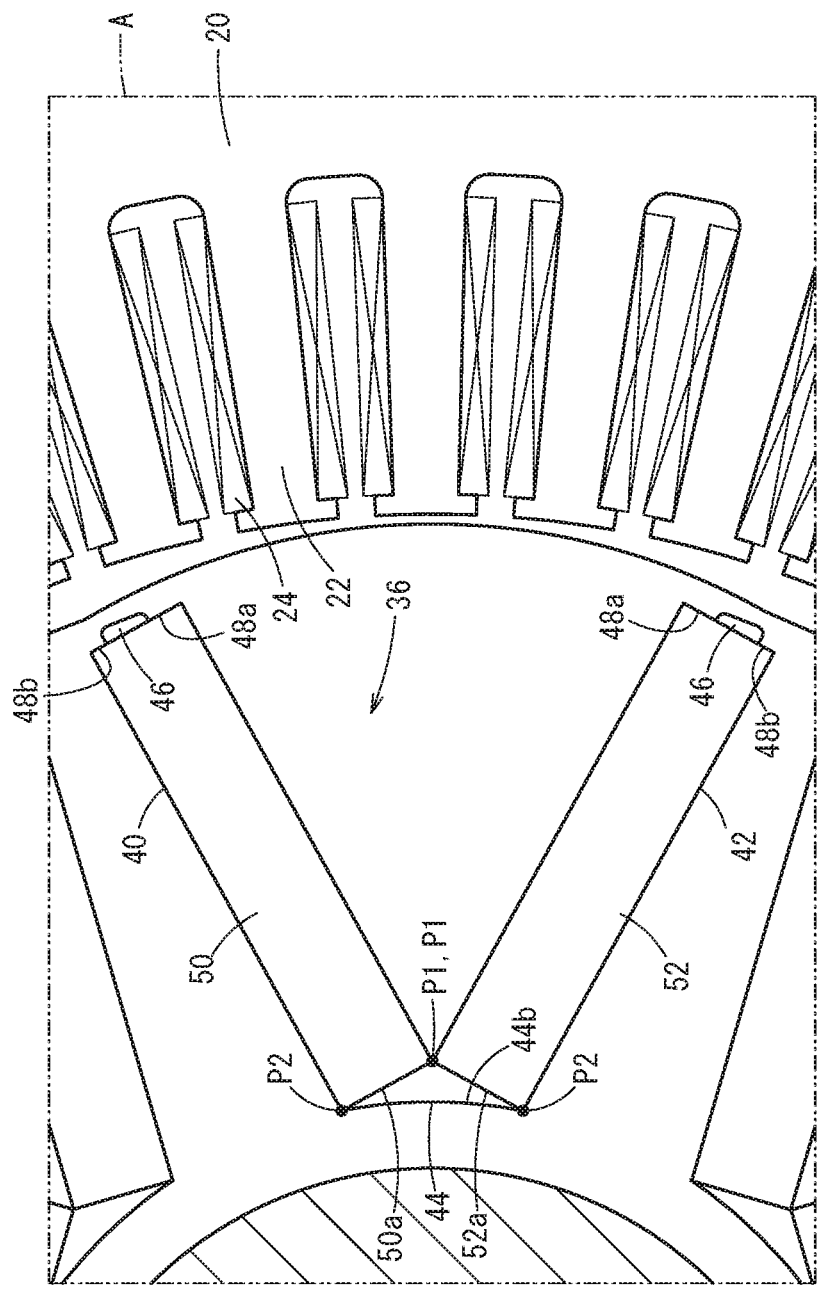
FIG. 5 is an enlarged view of the square frame portion A in FIG. 1.

In the first embodiment, although the first and second slots 40, 42 are apart at the endpoints P1, P1, the first and second slots 40, 42 may be in contact at the endpoints P1, P1. FIG. 5 is an enlarged illustration of the square frame portion A in FIG. 1. As shown in FIG. 5, the communication portion 44 is in the shape of a substantially isosceles triangle when the rotor core 30 is viewed from the direction of the rotary axis O. In this case, when the rotor core 30 is viewed from the direction of the rotary axis O, a space of the substantially isosceles triangle is formed by the side surface 44b connecting the endpoints P2, P2 of the communication portion 44 and the short edges 50a, 52a on the inner peripheral side of the first and second permanent magnets 50, 52.

[Second Modification]

In the first embodiment, when viewed from the direction of the rotary axis O of the rotor core 30, the first and second permanent magnets 50, 52 are formed to have substantially the same length as the first and second slots 40, 42. However, the first and second permanent magnets 50, 52 may be shorter than the length of the first and second slots 40, 42.

[Technical Idea or Concept Acquired from Embodiment]

Hereinafter, description will be made regarding the technical concept graspable from the foregoing embodiment.

The rotor (14) comprises the rotor core (30) rotatable together with the rotor shaft (34); the first slot (40) and the second slot (42) piercing the rotor core (30) in the direction of the rotary axis (0), each being substantially rectangular and together forming a V-shape with outer peripheral sides placed farther from each other and with inner peripheral sides placed closer to each other when viewed from the direction of the rotary axis (0) of the rotor core (30); the communication portion (44) piercing the rotor core (30) in the direction of the rotary axis (O) and connecting the inner peripheral sides of the first slot (40) and the second slot (42); the first permanent magnet (50) and the second permanent magnet (52) each being substantially rectangular when viewed from the direction of the rotary axis (O) of the rotor core (30), and inserted into the first slot (40) and the second slot (42), respectively; the first abutting portions (48a) being at short edges on the outer peripheral side of the first slot (40) and the second slot (42) and formed on inner sides of the first slot (40) and the second slot (42) when viewed from the rotary axis (0) of the rotor core (30), the first abutting portions (48a) abutting against the first permanent magnet (50) and the second permanent magnet (52); the second abutting portions (48b) being at short edges on the outer peripheral side of the first slot (40) and the second slot (42) and formed on outer sides of the first slot (40) and the second slot (42) when viewed from the direction of the rotary axis (0) of the rotor core (30), the second abutting portions (48b) abutting against the first permanent magnet (50) and the second permanent magnet (52); and flux barriers (46) provided between the first abutting portion (48a) and the second abutting portion (48b) and formed to bulge toward the outer peripheral side relative to the short edges on the outer peripheral side of the first slot (40) and the second slot (42) when viewed from the direction of the rotary axis (0) of the rotor core (30). With this configuration, it is possible to decrease a stress concentration value on the outer peripheral side of the first slot (40) and the second slot (42).

In the rotor (14), the first abutting portion (48a) may be longer than the second abutting portion (48b) when viewed from the direction of the rotary axis (0) of the rotor core (30). Thus, it is possible to decrease the leakage of magnetic flux with the flux barriers (46) and thus, to prevent torque from decreasing, whereby it is possible to avoid making the diameter of the rotor core (30) larger. Further, the cogging torque can be suppressed and the rotary electric machine 10 can rotate smoothly.

In the rotor 14, when viewed from the direction of the rotary axis (0) of the rotor core (30), the communication portion (44) may be a shape where the endpoints (P1, P1) which are closer to each other are connected and the endpoints (P2, P2) which are farther from each other are connected among the endpoints (P1, P1, P2, P2) of the short edges on the inner peripheral side of the first slot (40) and the second slot (42). With this configuration, the side surface on the inner peripheral side of the first permanent magnet (50) and the second permanent magnet (52) do not abut against the rotor core (30) over the entire surface, and thus, it is possible to decrease the leakage of magnetic flux.

In the rotor (14), the communication portion (44) may be a substantially triangle or a substantially trapezoid when viewed from the direction of the rotary axis (0) of the rotor core (30). With this configuration, it is possible to have room for the shrink-fitting of the rotor shaft (34).

In the rotor (14), the first permanent magnet (50) may be arranged such that the short edge (50a) on the inner peripheral side of the first permanent magnet (50) matches the short edge on the inner peripheral side of the first slot (40), and the second permanent magnet (52) may be arranged such that the short edge (52a) on the inner peripheral side of the second permanent magnet (52) matches the short edge on the inner peripheral side of the second slot (42). With this configuration, the first permanent magnet (50) and the second permanent magnet (52) abut against the endpoints (P2, P2) of the first slot (40) and the second slot (42) and thus, can be positioned relative to the first slot (40) and the second slot (42). Further, it is possible to shorten the length of the slots (36) in the radial direction of the rotor core (30) and hence, to make the diameter of the rotor core (30) shorter.

In the rotor (14), the flux barriers (46) and the communication portion (44) may be filled with a resin. With this configuration, it is possible to secure the first permanent magnet (50) and the second permanent magnet (52) relative to the first slot (40) and the second slot (42), respectively.

A rotary electric machine (10) has the aforementioned rotor (14). Therefore, it is possible to prevent the torque of the rotary electric machine (10) from decreasing.

It should be understood that the present invention is not limited to the above-described embodiment, and various alternative or additional configurations could be adopted therein based on the disclosed content of the present specification.

What is claimed is:

1. A rotor comprising:
a rotor core rotatable together with a rotor shaft;
a first slot and a second slot piercing the rotor core in a direction of a rotary axis, each being substantially rectangular and together forming a V-shape with outer peripheral sides placed farther from each other and with inner peripheral sides placed closer to each other when viewed from the direction of the rotary axis of the rotor core;
a communication portion piercing the rotor core in the direction of the rotary axis and connecting the inner peripheral sides of the first slot and the second slot;
a first permanent magnet and a second permanent magnet each being substantially rectangular when viewed from the direction of the rotary axis of the rotor core, and inserted into the first slot and the second slot, respectively;
first abutting portions being at short edges on the outer peripheral side of the first slot and the second slot and formed on inner sides of the first slot and the second slot when viewed from the direction of the rotary axis of the rotor core, the first abutting portions abutting against the first permanent magnet and the second permanent magnet;
second abutting portions being at the short edges on the outer peripheral side of the first slot and the second slot and formed on outer sides of the first slot and the second slot when viewed from the direction of the rotary axis of the rotor core, the second abutting portions abutting against the first permanent magnet and the second permanent magnet; and
flux barriers provided between the first abutting portion and the second abutting portion and formed to bulge toward the outer peripheral side relative to the short edges on the outer peripheral side of the first slot and the second slot when viewed from the direction of the rotary axis of the rotor core,
wherein the first abutting portion is longer than the second abutting portion when viewed from the direction of the rotary axis of the rotor core.

2. The rotor according to claim 1, wherein:
when viewed from the direction of the rotary axis of the rotor core, the communication portion is a shape where endpoints which are closer to each other are connected and endpoints which are farther from each other are connected among the endpoints of the short edges on the inner peripheral side of the first slot and the second slot.

3. The rotor according to claim 2, wherein:
the communication portion is a substantially triangle or a substantially trapezoid when viewed from the direction of the rotary axis of the rotor core.
4. The rotor according to claim 2, wherein:
the first permanent magnet is arranged such that the short edge on the inner peripheral side of the first permanent magnet matches the short edge on the inner peripheral side of the first slot; and
the second permanent magnet is arranged such that the short edge on the inner peripheral side of the second permanent magnet matches the short edge on the inner peripheral side of the second slot.
5. The rotor according to claim 1, wherein:
the flux barriers and the communication portion are filled with a resin.
6. A rotary electric machine having the rotor according to claim 1.

\* \* \* \* \*